No. 642,777. Patented Feb. 6, 1900.
J. C. ANDERSON.
WHEEL FOR AUTOTRUCKS.
(Application filed Aug. 25, 1899.)
(No Model.)
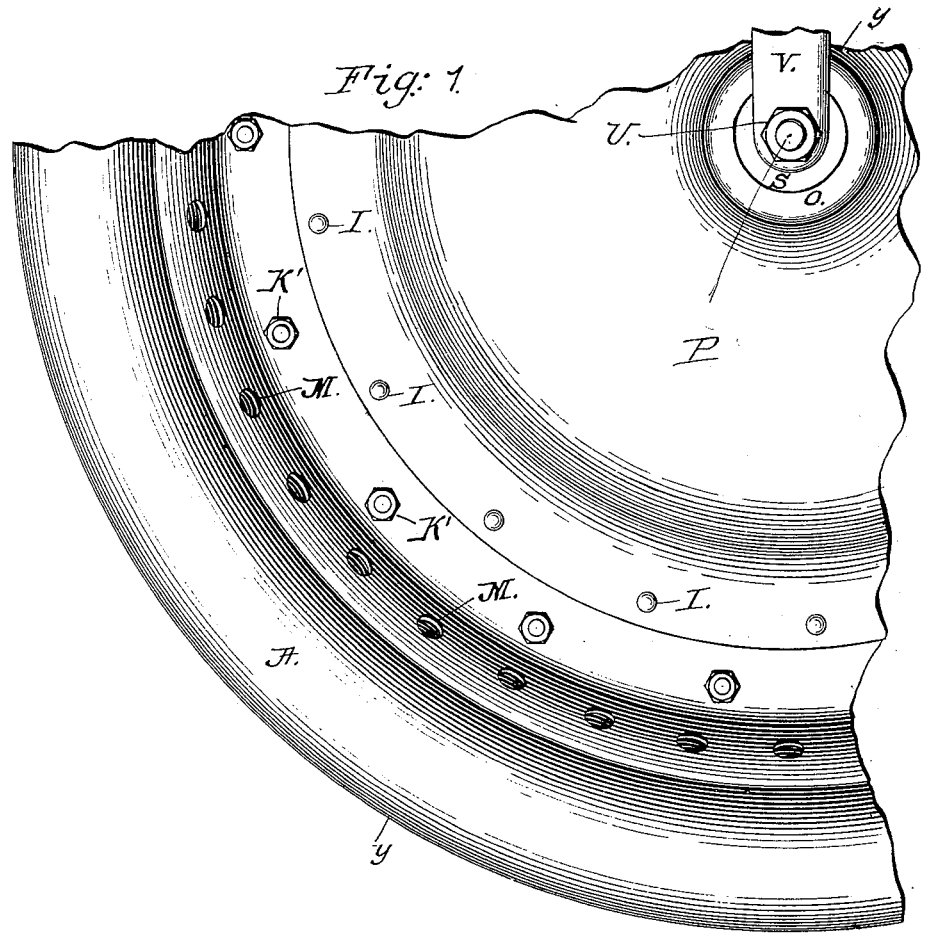
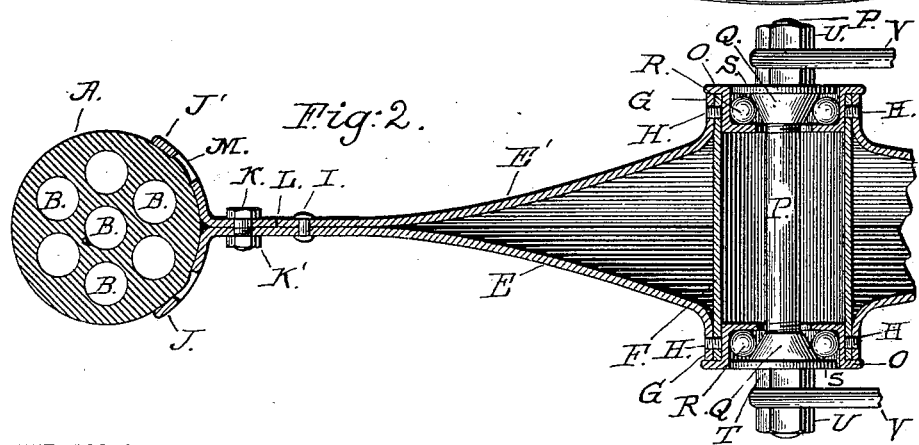
WITNESSES:
INVENTOR
Jas. C. Anderson
BY
ATTORNEY

UNITED STATES PATENT OFFICE.

JAMES C. ANDERSON, OF HIGHLAND PARK, ILLINOIS.

WHEEL FOR AUTOTRUCKS.

SPECIFICATION forming part of Letters Patent No. 642,777, dated February 6, 1900.

Application filed August 25, 1899. Serial No. 728,443. (No model.)

*To all whom it may concern:*

Be it known that I, JAMES C. ANDERSON, a citizen of the United States, residing at Highland Park, in the county of Lake and State of Illinois, have invented certain new and useful Improvements in Wheels for Autotrucks, &c.; and I do hereby declare the following to be a full, clear, and exact description of the invention, such as will enable others skilled in the art to which it appertains to make and use the same.

My invention relates to certain new and useful improvements in wheels designed for carrying heavy loads, and especially adapted to the use of a novel tire forming the subject-matter of another application filed by me August 11, 1899, Serial No. 726,887, and has for its object the production of a wheel composed entirely of metal and adapted to have one-half of the rim-flange readily removed and replaced in order that a new collapsible pneumatic tire may be put in position and rigidly secured in place.

With these ends in view my invention consists in the details of construction and arrangement hereinafte rdescribed, reference being had to the accompanying drawings, in which—

Figure 1 is a side elevation of a segment of a wheel embodying my improvements and provided with a tire made in accordance with the invention described in the pending application hereinbefore referred to, and Fig. 2 is a cross-section on the line $y\ y$ of Fig. 1.

Similar letters of reference indicate like parts in both figures of the drawings.

E E' are two disks of sheet-steel struck up into the form at Fig. 2, with an opening in the center to receive the hub F, composed of a section of steel tubing. The disks E and E' flare outwardly toward the center and surround the hub F. They are each formed with an annular flange G, within which the hub is firmly secured by radial rivets H. The disks contact for about one-third of their radius and are rigidly connected by rivets I at suitable distances apart. The disk E terminates in a curve constituting one half J of the tire-rim. The other half J' of the rim is made separate and is secured to the disk E by removable screw-bolts K and nuts K'. The interior periphery of rim J' rests upon the periphery of the disk E', as clearly shown at L, so that when the said rim is secured in place the disk E' and its rim are substantially the same as the disk E and its rim. Each of the rim portions is provided with a series of perforations M, and when the tire A is secured in position within the rim the resilient body of the tire will, under the expansive force of the contained air, be forced nipple-like into the perforations M, as clearly shown at Fig. 2. These nipple-like projections constitute checks or detents against the creeping action of the tire within its rim.

The hub F is provided at each end with a ball-cup O, which is secured in place in any well-known manner.

P is the axle, threaded at each end to receive cone-nuts Q, between which and the ball-cups O are confined antifriction-balls R. Dust-plates S close the open ball-cups by contacting with the outer ends of the cone-nuts Q and are held in place by jam-nuts T, between which and nuts U are confined the forks or other frame-supports V.

When it is desired to remove the tire N, the nuts K' are removed and bolts K withdrawn, whereupon the rim J' may be taken away, leaving the tire free for removal in an obvious manner.

While I have shown the disks imperforate on their faces, it will be understood that when metal of sufficient gage is used to permit it the faces of the disks may be perforated in any fanciful form to lighten the structure without destroying its strength.

The construction and arrangement of the hub and axle and the connection with the disks E and E' may be varied without departing from the spirit of my invention, although I prefer the construction shown as one very economic and efficient.

The important feature of my invention in my improved wheel resides in the sheet-metal disks and rim J J', so constructed that a non-deflatable tire may be put in position and readily removed, as hereinbefore explained.

I am aware that wheels have been made of two dish-shaped disks of sheet metal secured by rivets to a hub, and that the peripheries of the said disks have been extended laterally to constitute, when the disks are riveted together, a rigid and continuous rim for the reception of a tire, but such rims are only adapted to receive a collapsible or deflatable tire, and I do not wish to be understood as claiming any such construction; but What I do claim as new, and desire to secure by Letters Patent, is—

1. A wheel adapted to carry a non-deflatable pneumatic tire and consisting of two sheet-metal disks E and E', secured together and surrounding and secured to a central hub, one of said disks E terminating peripherally in one half J of a tire-rim, and the other disk E', of less diameter and minus a rim portion, in combination with a rim portion J' corresponding with the rim portion J of the disk E and formed with a radial web secured in position by screw-bolts and nuts K and K' substantially as and for the purposes set forth.

2. In a wheel adapted for use with a non-deflatable tire, metal disks E and E' constructed and secured together as described, and formed with hub-flanges G, G, in combination with a tubular hub F, radial rivets H, ball-cups O, axle P, cone-nuts Q, dust-plates S, balls R and nuts T and U, substantially as and for the purposes set forth.

In testimony whereof I affix my signature in presence of two witnesses.

JAMES C. ANDERSON.

Witnesses:
JENNIE G. BOOTH,
DANL. W. BONN.